United States Patent [19]

Mondini

[11] Patent Number: 5,475,965

[45] Date of Patent: Dec. 19, 1995

[54] MACHINE FOR SEALING CONTAINERS BY APPLYING A COVERING FILM

[75] Inventor: Giovanni Mondini, Cologne Bresciano, Italy

[73] Assignee: G. Mondini S.p.A., Cologne Bresciano, Italy

[21] Appl. No.: 426,761

[22] Filed: Apr. 21, 1995

[30] Foreign Application Priority Data

May 6, 1994 [IT] Italy ................... MI94A0901

[51] Int. Cl.⁶ ............................. B65B 7/28; B65G 25/00
[52] U.S. Cl. ...................... 53/287; 53/329.3; 198/468.1; 198/742
[58] Field of Search ................... 53/329, 329.3, 53/287, 306, 281, 310, 373.7; 198/346.2, 468.1, 740, 741, 742

[56] References Cited

U.S. PATENT DOCUMENTS

| | | | |
|---|---|---|---|
| 1,577,627 | 3/1926 | Webster | 198/742 X |
| 2,295,049 | 9/1942 | Pityo | 53/329 X |
| 3,135,395 | 6/1964 | Wallis | 198/740 X |
| 3,345,797 | 10/1967 | Von Stoeser | 53/329 X |
| 3,430,782 | 3/1969 | Henkel | 198/468.1 X |
| 3,453,167 | 7/1969 | Arvidson et al. | 198/468.1 X |
| 3,507,093 | 4/1970 | Marion | 53/329 R |
| 3,754,667 | 9/1973 | Storch | 198/740 X |
| 3,757,961 | 9/1973 | Jacobs | 198/740 X |
| 3,841,468 | 10/1974 | Eggert | 198/740 X |
| 4,974,392 | 12/1990 | Mondini | 53/329 X |

Primary Examiner—Horace M. Culver
Attorney, Agent, or Firm—Guido Modiano; Albert Josif

[57] ABSTRACT

The present invention relates to a machine for sealing containers by applying a covering film, which comprises a framework for supporting a container sealing unit which is located between a unit for feeding the containers to be sealed and a conveyor for removing the sealed containers. There are also pusher arms which are detachably associable with multiple containers to transfer them from the feeder unit to the sealing unit and from the sealing unit to the removal conveyor. The particularity of the invention resides in the fact that the feeder unit comprises an accumulation conveyor which is located upstream of the sealing unit and downstream of at least one buffer conveyor which is interposed between the accumulation conveyor and an external feeder conveyor. There are also detectors for measuring the distance and speed of the containers fed onto the buffer conveyor; these detectors drive the motors that actuate the buffer conveyor in order to feed the containers at a preset speed and in a preset position onto the accumulation conveyor.

10 Claims, 7 Drawing Sheets

MACHINE FOR SEALING CONTAINERS BY APPLYING A COVERING FILM

BACKGROUND OF THE INVENTION

The present invention relates to a machine for sealing containers by applying a covering film.

U.S. Pat. No. 4,974,392 in the name of the same Applicant, assumed included herein as reference, discloses a machine for closing containers by means of a sealing film, which substantially comprises a frame on which a conventional sealing head is located; said head applies the sealing film to the various containers, which are fed sequentially below the head.

In this patent, upstream of the sealing head there is an accumulation belt that moves intermittently so as to allow to prepare, upstream of the sealing head, a certain number of containers, which is a function of the size of said containers, before feeding all the containers below the sealing head by means of a pair of pusher arms with grip regions that simultaneously place below the sealing head the accumulated and positioned containers and remove from the sealing head the containers that have already been closed to place them on a removal conveyor.

This embodiment is particularly advantageous, since it allows the number of containers that can be accumulated to become practically independent of the pitch of the feeder conveyor, which corresponds to the maximum size of the containers that can be sealed by the apparatus.

With the arrangement disclosed in said patent, if one changes containers and works for example with smaller containers, the pitch, that is to say the distance between one container and the next, can be reduced, consequently increasing the number of containers that can be sealed fully and reducing the waste of sealing film.

This advantage is obtained by means of the accumulation conveyor, which advances intermittently, so as to gather a number of containers that increases if the size of the containers to be sealed decreases, so that the pusher arms, which are shaped according to the shape and number of the containers, can convey a larger number of closely arranged containers to the sealing station, reducing production time as well as the waste of sealing film.

This solution can be improved, especially as regards the elimination of downtimes: in the above described solution, the accumulation conveyor advances intermittently and in practice stops while waiting for the incoming containers.

It should be noted that in many cases the containers to be sealed contain liquid substances, and therefore it is necessary to use rather low acceleration values and perform speed changes very gradually in order to prevent spillage of the liquid present inside the containers.

SUMMARY OF THE INVENTION

A principal aim of the invention is indeed to provide improvements to the machine briefly described above, especially as regards its operating speed, allowing to perform an electronic control of the accumulation of the containers on an accumulation conveyor that can position and accumulate the containers without having to stop sequentially.

Within the scope of this aim, a particular object of the invention is to provide a machine for sealing containers which can arrange the containers at the distance required to allow them to be gripped by the pushers and transferred to the sealing head, regardless of the speed at which they travel or of the uniformity, or non-uniformity, of the flow of the incoming containers to be closed.

Another object of the present invention is to provide a machine in which the movement of the containers through the various operating steps fully eliminates sudden speed changes and most of all container stoppages which, as mentioned earlier, entail long times for their restart, since it is necessary to use relatively low acceleration values.

Another object of the present invention is to provide a machine that by virtue of its particular constructive characteristics is capable of giving the greatest assurances of reliability and safety in use.

This aim, these objects, and others which will become apparent hereinafter are achieved by a machine for sealing containers by applying a covering film, according to the invention, which comprises a framework for supporting a container sealing unit which is located between a unit for feeding the containers to be sealed and a conveyor for removing the sealed containers, pusher arms being furthermore provided, said arms being detachably associable with multiple containers to transfer said containers from said feeder unit to said sealing unit and from said sealing unit to said removal conveyor, characterized in that said feeder unit comprises an accumulation conveyor which is located upstream of said sealing unit and downstream of at least one buffer conveyor which is interposed between said accumulation conveyor and an external feeder conveyor, means being furthermore provided for measuring the distance and speed of the containers fed onto said at least one buffer conveyor, said measurement means driving the motor means that actuate said buffer conveyor to feed the containers at a preset speed and in a preset position onto said accumulation conveyor.

BRIEF DESCRIPTION OF THE DRAWINGS

Further characteristics and advantages will become apparent from the following detailed description of a preferred but not exclusive embodiment of a machine for sealing containers by applying a covering film, illustrated only by way of non-limitative example in the accompanying drawings, wherein.

DESCRIPTION OF THE PREFERRED EMBODIMENTS

Figure 1:
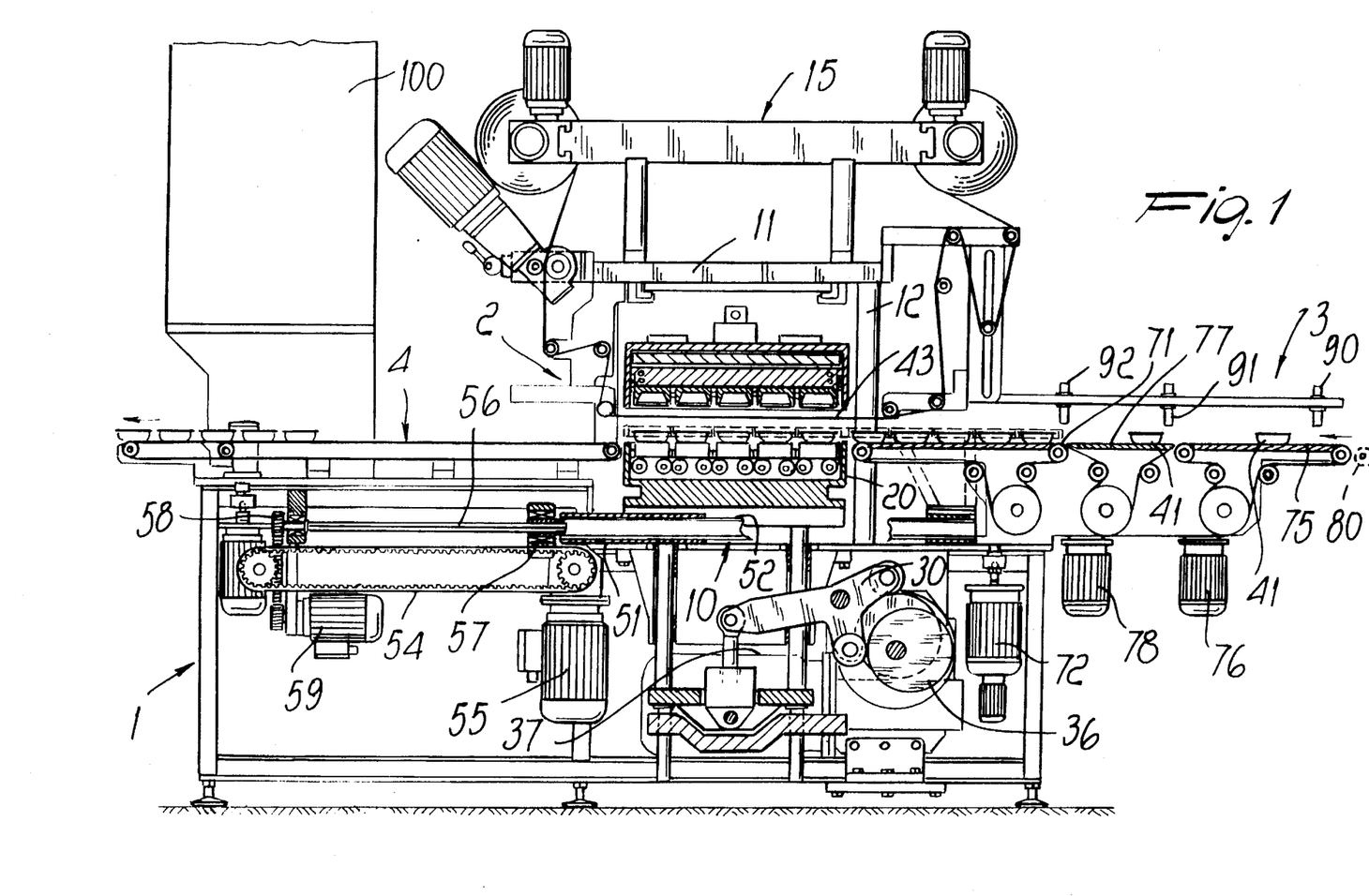
FIG. 1 is a schematic, partially sectional elevation view of the machine according to the invention.
Figure 2:
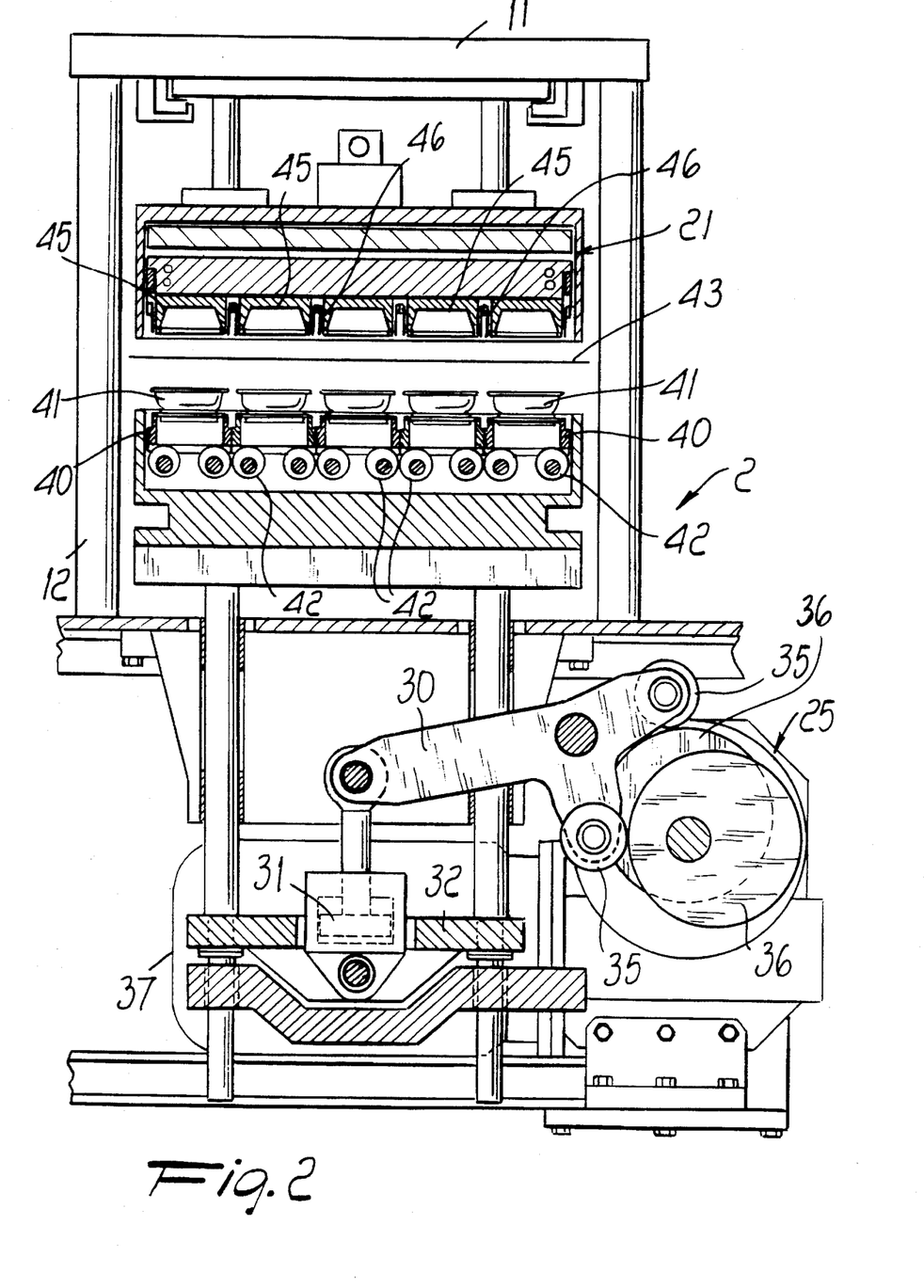
FIG. 2 is a schematic view of the sealing head in the inactive position.
Figure 3:
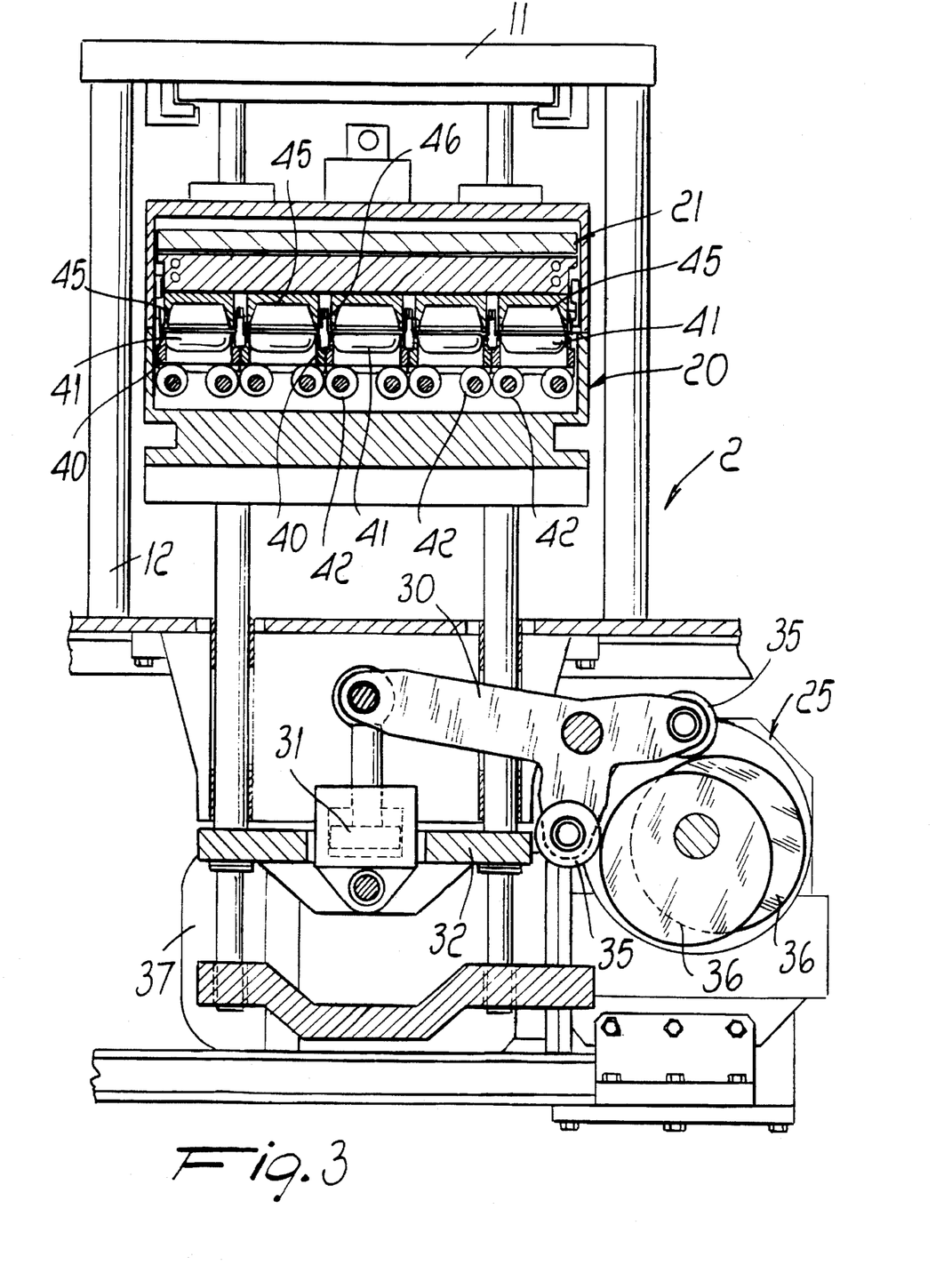
FIG. 3 is a sectional view of the sealing head during the application of the covering film.
Figure 4:
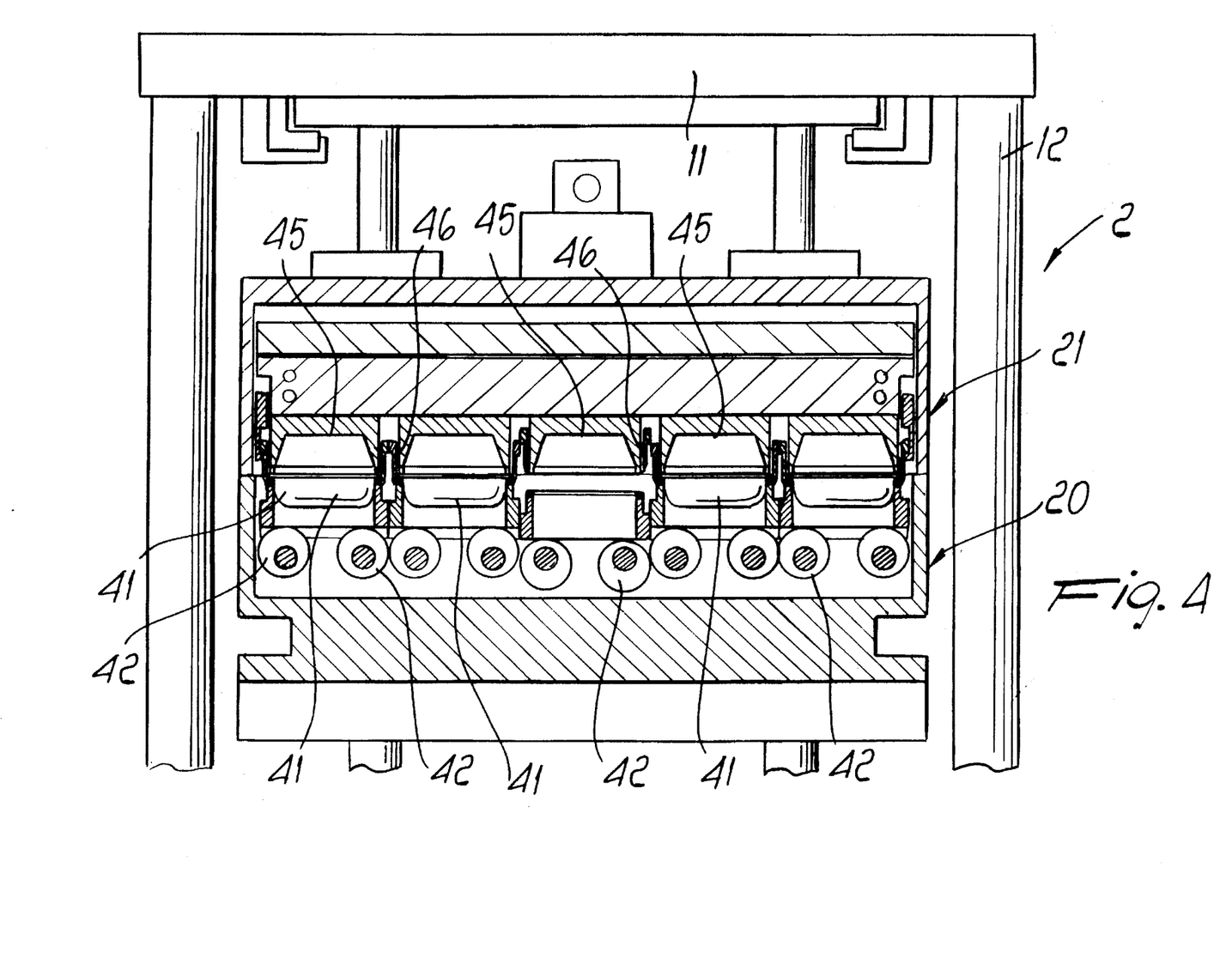
FIG. 4 is an enlarged-scale view of the detail of the sealing head in the case of a missing container.
Figure 5:
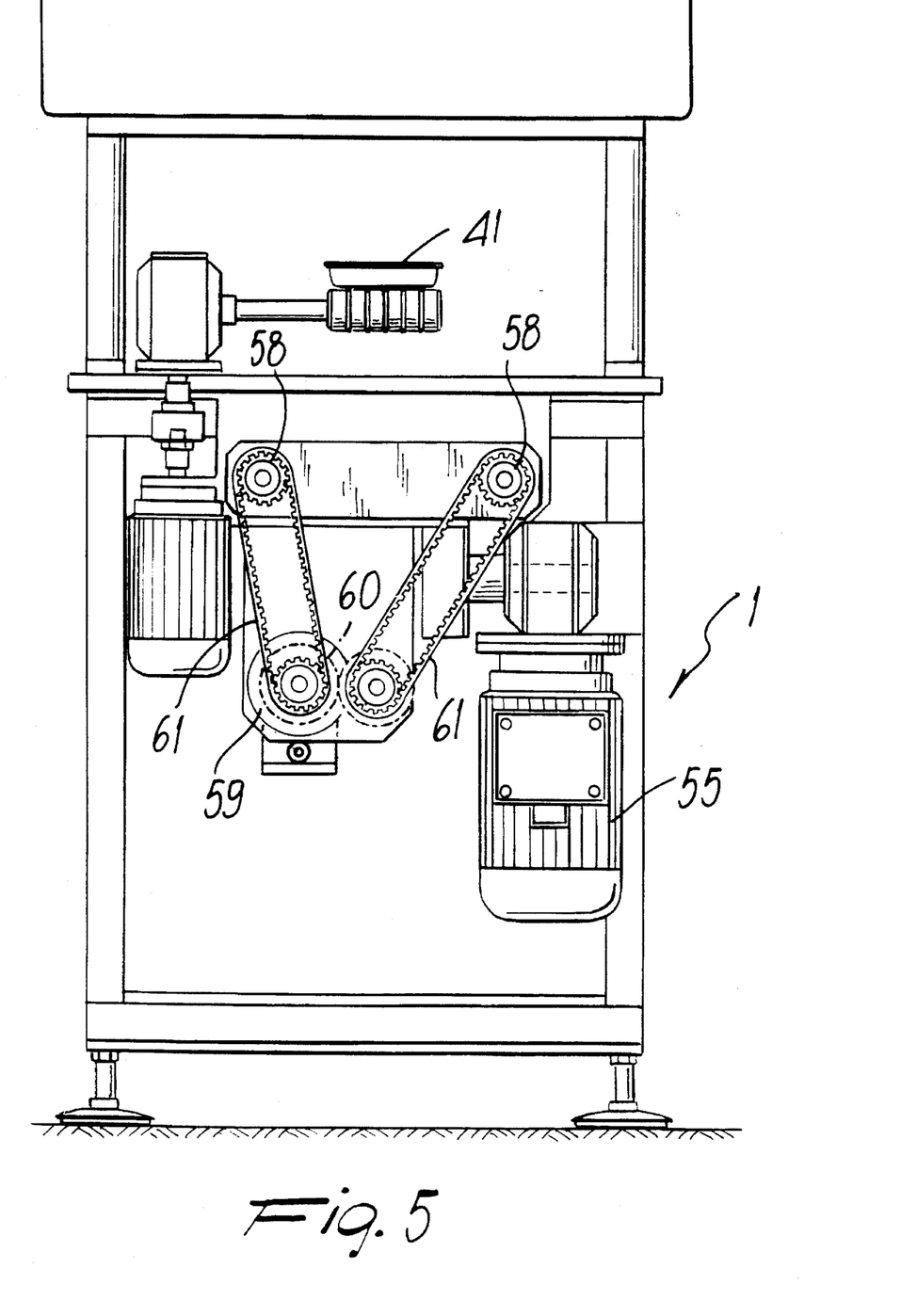
FIG. 5 is a lateral elevation view of the machine.
Figure 6:
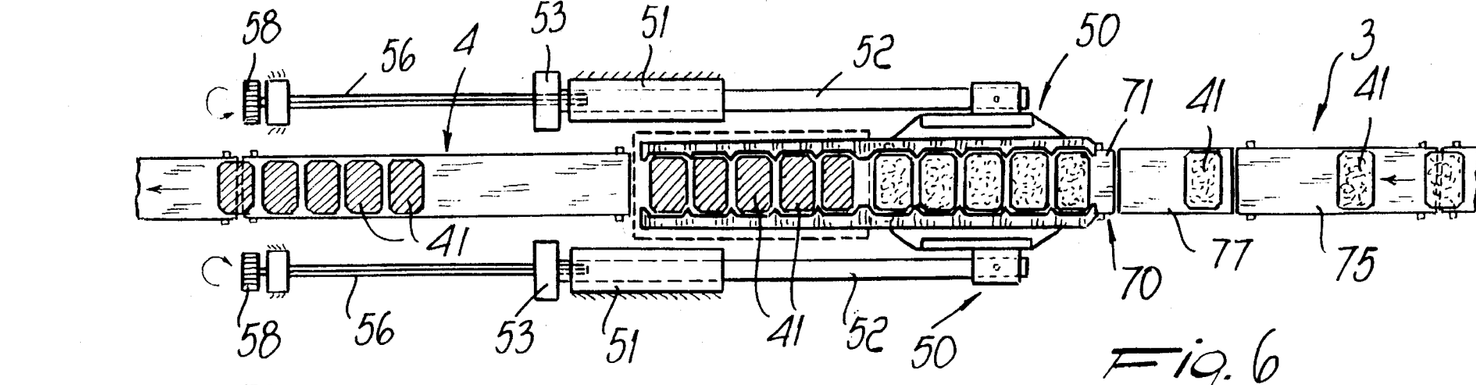
FIGS. 6 to 9 are schematic sequential views of the steps of the positioning of the containers on the machine according to the invention.
Figure 7:
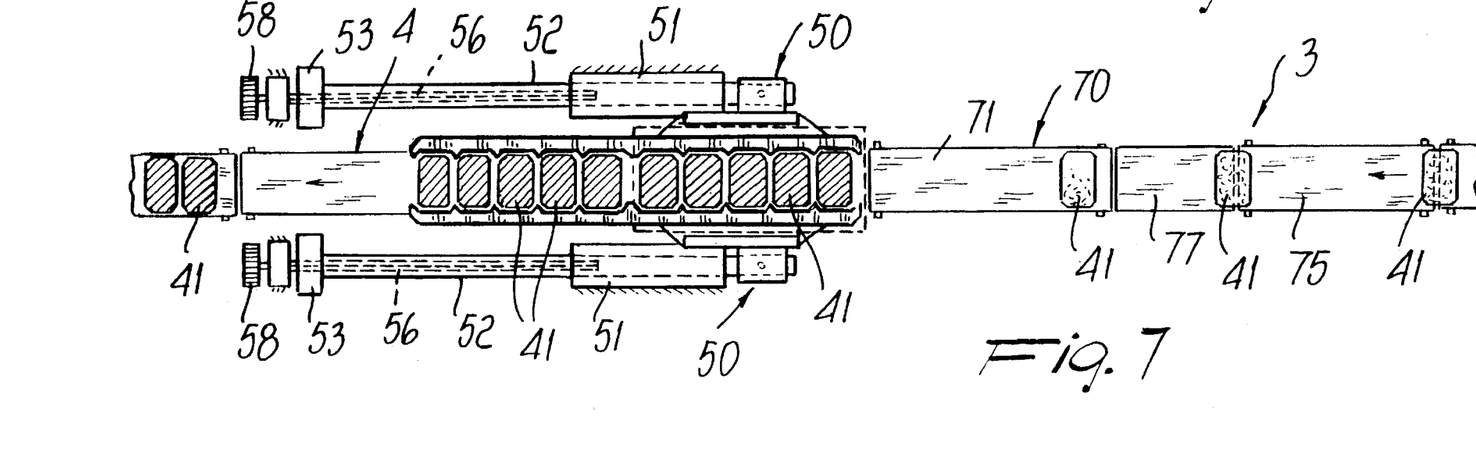
Figure 8:
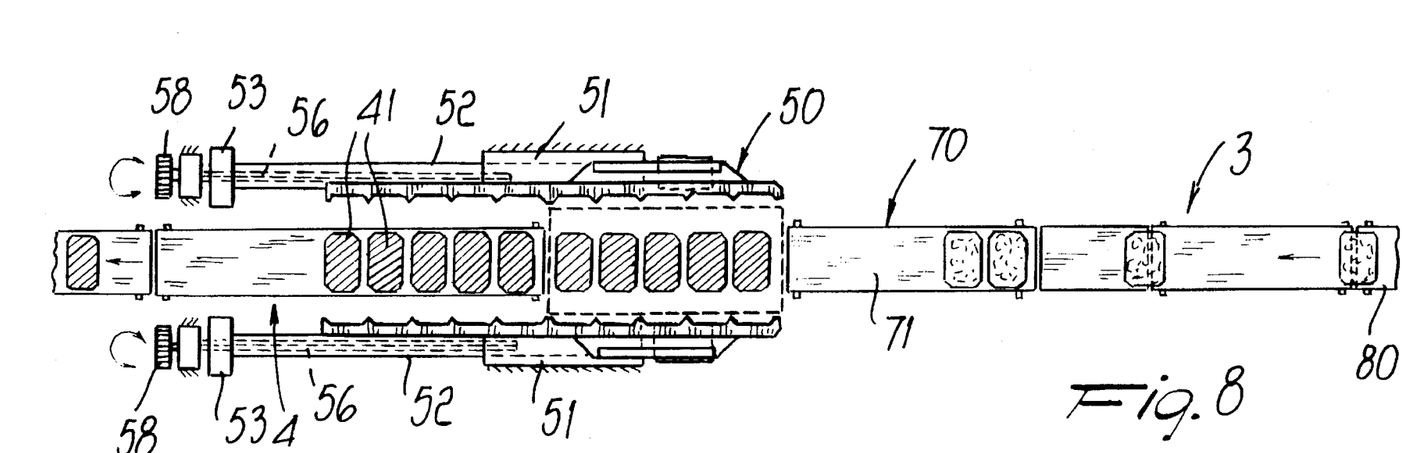
Figure 9:
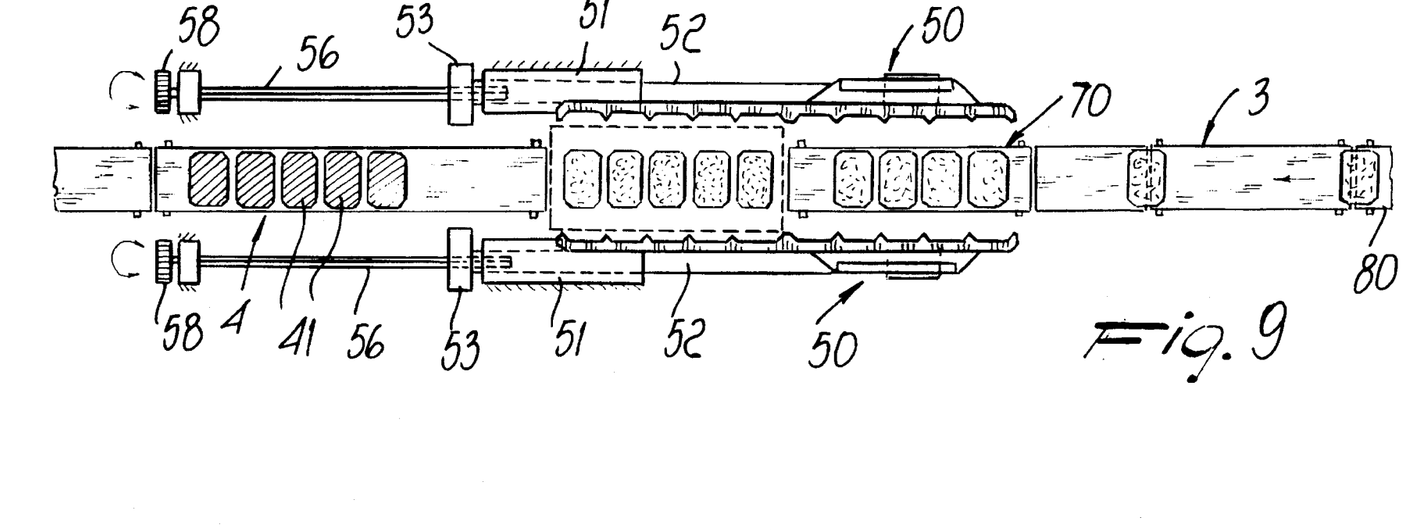

With reference to the above figures, the machine for sealing containers by applying a covering film according to the invention comprises a supporting framework, generally designated by the reference numeral 1, on which a sealing unit 2 is located; said sealing unit is interposed between a feeder unit 3 for feeding the containers to be sealed and a conveyor 4 for removing the sealed containers.

More specifically, the framework 1 has a lower frame 10 which substantially forms the base of the machine and the coverings of all the various control parts of the machine.

An upper plate 11 is associated with the lower frame 10 and is supported by posts 12 that protrude from the lower frame that forms the footing for supporting the assembly 15 of the various devices related to the handling of the covering film to be applied to the containers, i.e. rolls, roll holders, and actuation motors.

The sealing unit 2 is accommodated below the plate 11 to apply a covering film by heat-sealing or to seam a film which acts as lid; the unit 2 has a lower head 20 and an upper sealing head 21 which is supported below the plate 11.

The lower sealing head is connected to a cam-based actuation unit 25 that moves the lower head by virtue of the presence of a rocker lever 30 which is pivoted in a median portion thereof and acts, at one end, on a fluid-actuated cylinder 31 which is articulated to the lower framework 32 of the sealing head.

The presence of the fluid-actuated cylinder allows to control and adjust the pressure applied during sealing.

The rocker lever 30 has, at its other end, cam-follower rollers 35 which act on eccentric cams 36 to follow the reciprocating translatory motions of the lower sealing head; said cams 36 are actuated by a variable-speed electric motor 37 which is connected to, and controlled by, a central control unit 100 according to the flow of incoming containers and to the consequent speeds reached by the conveyors during feeding.

The lower sealing head is provided with the various molds 40 for accommodating the containers 41, which are supported by eccentric elements 42 that can be actuated so as to lower the relative position of the mold when the container is not present, so as to prevent the mold from making contact with the sealing film, designated by the reference numeral 43.

Complementary molds 45 are correspondingly provided on the upper head and are flanked by cutting blades 46 which cut the sealing film; the cutting blades are operatively connected to the eccentric elements 42, so as to keep the cutting blade in raised position, when the corresponding mold is placed in lowered position.

Two pusher arms 50 are arranged laterally adjacent to the sealing unit and form opposite grip seats which have the purpose of engaging the group of containers to be moved, so as to feed said containers below the sealing head and remove the sealed containers to feed them onto the removal conveyor.

The pushers 50 are substantially provided as described in the previously mentioned patent and comprise a sliding bush 51 which is fixed to the framework 1 and internally supports a tubular element 52 which is connected to the arms 50 at one end and, at the other end, to a coupling block 53 which is fixed to a toothed translatory motion belt 54 which is actuated by a first servomotor 55 which is also connected to the central control unit 100 for controlling longitudinal motion.

A splined shaft 56 is provided inside the tubular element 52 and is connected to the outer tubular element by means of a splined bush 57 of the ball-bearing type for controlling the rotation of the arms 50, which is achieved by rotating both splined shafts 56 to which toothed pulleys 58 are connected; said pulleys draw their motion from a second servomotor 59, which is provided with a gear coupling 60, so as to drive toothed belts 61 which rotate both splined shafts located on the two sides of the machine, so as to actuate the two pusher arms with a synchronous and mutually opposite motion.

The second servomotor is also controlled by the central control unit 100 to achieve the desired sequence of movements that will be described in detail hereinafter.

The feeder unit 3 is constituted by an accumulation conveyor 70 arranged directly upstream of the sealing unit 2 and constituted for example by an accumulation belt 71 which is actuated by a third servomotor with an encoder 72 for continuous speed measurement.

Upstream of the accumulation conveyor there are buffer conveyors which are constituted for example by a first buffer conveyor 75 which comprises a first buffer belt which is driven by a first servomotor with an encoder 76 and a second buffer conveyor which in this case comprises a second buffer belt 77 which is driven by a second servomotor with an encoder 78; both have the purpose of feeding the containers at the desired speed and in the desired position.

The buffer unit is interposed between the accumulation conveyor and the feeder conveyor, of a per se known type, which is generally designated by the reference numeral 80.

A first detector is provided at the inlet of the first buffer conveyor 75 and is constituted by a first photocell 90 which measures the distance and speed of the containers and adjusts the rotation rate of the first servomotor with encoder 76; at the beginning of the second conveyor 77 there is a second detector which is constituted by a second photocell 91 having the purpose of adjusting the translatory speed of the second buffer conveyor 77 so as to move the container into the desired position and at the desired speed on the accumulation belt 71.

There is also a third detector which is constituted by a third photocell 92 which is located at the beginning of the accumulation conveyor.

The machine as described above is capable of receiving, in order to perform sealing, containers that arrive from external feeders constituted by chains, various belts, generic pusher transfer devices, or belt devices for weight checking, and can align and arrange the containers, regardless of the speed at which they are traveling and of the uniformity of the incoming flow, so that said containers are at the distance required to make the pusher arms 50 grip and transfer them to the sealing unit 2 without causing sudden variations in speed, let alone stops, during these transitions.

The detector constituted by the photocell 90, located at the first buffer belt 75, measures the speed and mutual distance of the containers, so that on the basis of these measured data and of the parameters provided as part of the programming, the central unit issues the corresponding speed commands to the first servomotor with encoder 76 in order to set the speed that the first buffer conveyor 75 must assume.

The second photocell 91, located between the first buffer conveyor 75 and the second buffer conveyor 77, also detects the distance and the speed and, if they are still not the desired ones, the second buffer belt 77 is capable of completing the correction by actuating the second servomotor with encoder 78.

At this point, the containers 41 pass onto the accumulation belt, which advances at the speed required by the machine production, which is the same speed assumed by the containers 41 at the output of the second buffer belt 77; the speed is set by means of the first servomotor with encoder 76.

In this condition, the pusher arms 50 are located laterally adjacent to the accumulation belt and are already moving so as to travel at the same speed by virtue of the action of the first servomotor 55.

The second servomotor 59 that controls the rotation of the pusher arms 50 makes them grip the containers.

Once the pushers have engaged the containers, the first servomotor that controls the translatory motion of the pusher arms can increase its speed according to optimized acceleration gradients and then decelerate with the same criterion, until the containers are arranged correctly below the sealing head.

When the flow of containers is uniform and constant, it is relatively easy to achieve the above described function. Instead, when a container is missing or is simply delayed with respect to the preceding one during a cycle, all the potential of the concept underlying the invention is exploited.

In this case, the first photocell detects a certain delay of the container with respect to the preceding one, so that the central unit calculates the speed changes to be applied to the first buffer belt 75 and optionally to the second buffer belt 77, so that the container 41 resumes the correct distance before it passes to the accumulation belt 71.

When the distance is greater than the distance assigned to a container, the central unit 100 supplies commands to the buffer and accumulation belts and to the actuation units of the pusher arms, so that they can all vary their respective speeds in order to vary the overall speed of the machine.

For example, if the mold handles five containers per cycle, if a container is found missing the overall speed is reduced by approximately 20%; if another container is also missing, a further 20% decrease is required; if another consecutive container is missing, it is advisable to stop the machine, always by using the optimized acceleration gradients.

The machine can compensate, without stopping, a lack of up to 50% of the containers; operation then resumes automatically with the same characteristics.

Another possibility of machine management allows to prepare an operating cycle in which, if a container is missing, the machine is not slowed down but the containers are placed on the accumulation conveyors so as to leave a missing space.

In this case, the central unit 100 automatically disables, by means of the eccentric elements, the actuation of the mold that corresponds to the missing container or containers.

From what has been described above it is thus evident that the invention achieves the intended aim and objects, and in particular the fact is stressed that a machine is provided in which, by virtue of the presence of the buffer belts upstream of the accumulation conveyor, it is possible to correctly arrange the desired number of containers at the set distance without having to stop the machine, thus allowing to considerably increase the operating speeds since the fact that the containers are not stopped, as instead occurred in the previously mentioned patent, allows to maintain higher operating speeds without running the risk of subjecting the containers to sudden accelerations that might cause any liquids contained therein to spill.

The invention thus conceived is susceptible of numerous modifications and variations, all of which are within the scope of the inventive concept.

All the details may furthermore be replaced with other technically equivalent elements.

In practice, the materials employed, as well as the contingent shapes and dimensions, may be any according to the requirements.

What is claimed is:

1. Machine for sealing containers by applying a covering film, comprising:

a framework;

a container sealing unit supported on said framework;

a feeding unit for feeding the containers to be sealed;

a removal conveyor for removing sealed containers, said sealing unit being located between said feeding unit and said removal conveyor;

pusher arms for transferring said containers from said feeding unit to said sealing unit and from said sealing unit to said removal conveyor, said arms being detachably associable with a plurality of containers, wherein said feeding unit comprises: an accumulation conveyor, said accumulation conveyor being located upstream of said sealing unit; at least one buffer conveyor, said buffer conveyor being located ahead of said accumulation conveyor, and interposed between the accumulation conveyor and an external feeder conveyor; measuring means for measuring a distance and speed of containers fed onto said at least one buffer conveyor; and motor means for actuating said buffer conveyor to feed the containers at a preset speed and in a preset position onto said accumulation conveyor, said motor means being controlled by said measuring means.

2. Machine according to claim 1, wherein said sealing unit has a lower sealing head and an upper sealing head, said lower sealing head being connected to a cam-based actuation unit to move the lower head with respect to said upper head, said cam-based actuation unit having a rocker lever which is connected to said lower head by interposing a fluid-actuated cylinder for controlling and adjusting pressure during sealing.

3. Machine according to claim 2, further comprising eccentric cams for actuating said rocker lever, said rocker lever being actuated by a variable-speed electric motor which is controlled by a central control unit.

4. Machine according to claim 2, wherein said lower head has a plurality of molds for accommodating containers to be sealed which are supported by means for deactivating the corresponding molds, said means being constituted by eccentric elements for supporting said molds.

5. Machine according to claim 4, wherein said upper head has complementary molds which are flanked by cutting blades, said eccentric elements being operatively connected to said cutting blades to place said cutting blades in an inactive position when a corresponding mold is lowered if a corresponding container is missing.

6. Machine according to claim 1, further comprising means for actuating said pusher arms which are constituted by a tubular element for each arm, said tubular element being slidingly coupled to a sliding bush which is fixed to the framework of the machine, said bush supporting, at one end, the corresponding pusher arms, said arms having, at their other end, a block for connecting to a toothed translatory motion belt, said belt being driven by a first servomotor that is connected to said central control unit, for controlling a longitudinal motion of said arms, a splined shaft being provided inside said tubular element, said splined shaft being supported by a splined bush of the ball-bearing type, said splined shaft being associated with a second servomotor which is controlled by said central control unit, said second servomotor synchronously actuating in opposite directions the pusher arms which are arranged laterally adjacent to said sealing head.

7. Machine according to claim 6, comprising, upstream of said accumulation conveyor, a first and a second buffer conveyors, said buffer conveyors being respectively actuated by a first servomotor with encoder and by a second servomotor with encoder, said servomotors with encoders being controlled by said central unit, a third servomotor with encoder being furthermore provided and actuating said accumulation conveyor.

8. Machine according to claim 7, wherein said measuring means comprises a first detector located at a beginning of said first buffer conveyor, a second detector located at a beginning of said second buffer conveyor, and a third detector located at a beginning of said accumulation conveyor, said detectors being operatively connected to said central unit.

9. Machine according to claim 8, wherein said detectors are constituted by photocells.

10. Machine according to claim 8, wherein said detectors are controlling positioning of a plurality of containers in a preset position on said accumulation conveyor which moves at a preset speed, said pusher arms moving at a speed that is synchronous with the containers provided on said accumulation belt when said arms must engage the containers provided on said accumulation conveyor.

* * * * *